United States Patent

[11] 3,631,460

| [72] | Inventor | John A. Haase |
| | | Bloomington, Minn. |
| [21] | Appl. No. | 1,080 |
| [22] | Filed | Jan. 7, 1970 |
| [45] | Patented | Dec. 28, 1971 |
| [73] | Assignee | Control Data Corporation |
| | | Minneapolis, Minn. |

[54] DISPLAY APPARATUS
7 Claims, 5 Drawing Figs.

[52] U.S. Cl. .................................................. 340/339,
340/334, 328/43, 328/267
[51] Int. Cl. ........................................................ G09b 13/00
[50] Field of Search ........................................... 340/339,
336, 334; 235/92 NG, 92 EA

[56] References Cited
UNITED STATES PATENTS
| 3,493,957 | 2/1970 | Brooks .......................... | 340/339 X |
| 3,445,827 | 5/1969 | Keyes ............................ | 340/334 X |

*Primary Examiner*—Thomas B. Habecker
*Assistant Examiner*—Michael Slobasky
*Attorneys*—Richard P. Ulrich, Thomas G. Devine, Joseph A. Genovese and Paul L. Sjoquist

ABSTRACT: Display apparatus providing a visual indication of the status of bistable devices. The display apparatus also coupling the voltage generated in an inductor, as its field collapses, to utilization means whenever the breakdown voltage of devices exhibiting high-impedance characteristics prior to breakdown and low impedance thereafter is exceeded. The devices being used in connection with a ring which takes advantage of the fold-back characteristic of a commercially available voltage regulator to control pulse advance.

Patented Dec. 28, 1971

INVENTOR.
JOHN A. HAASE

BY

ATTORNEY

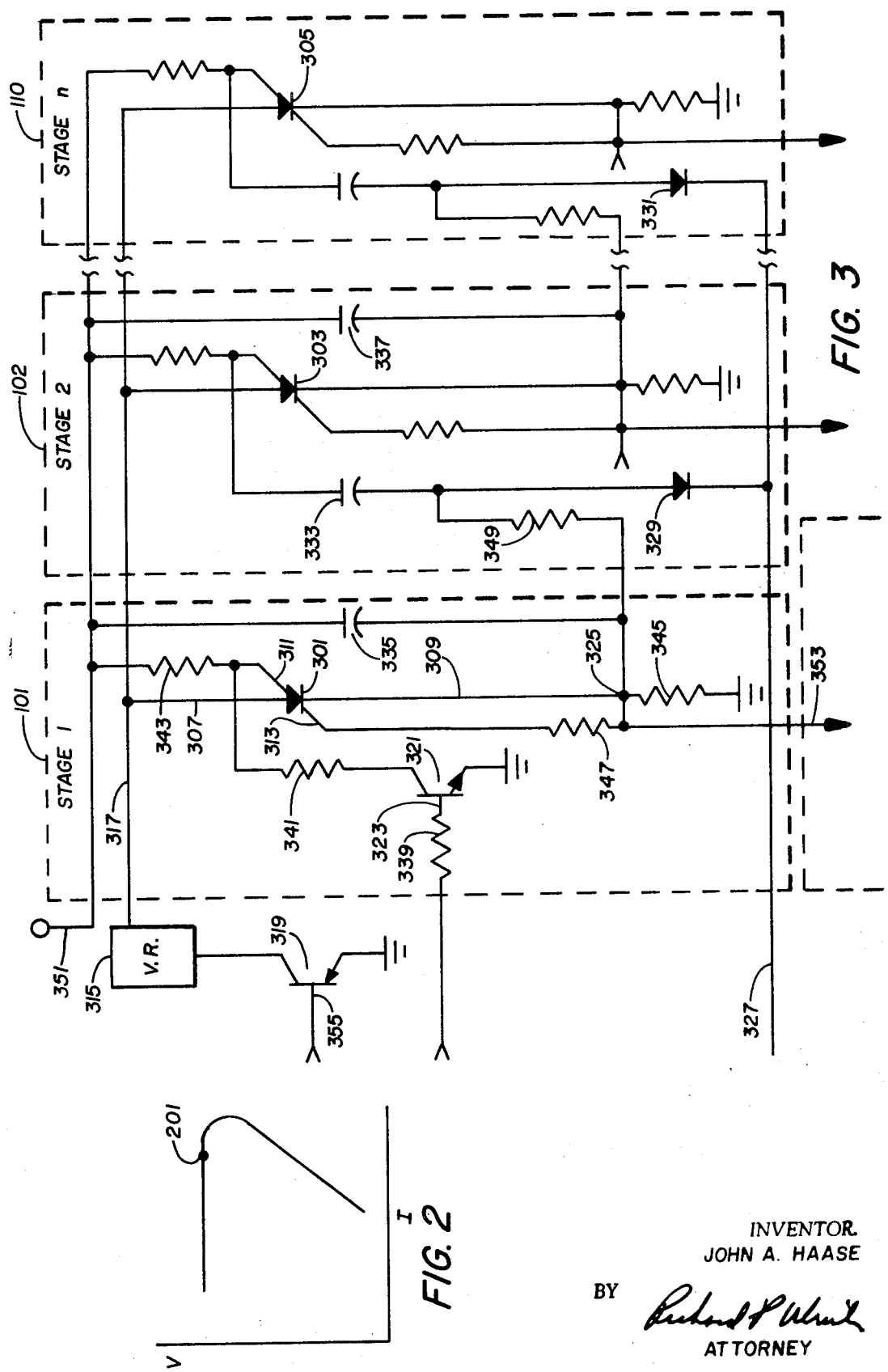

Patented Dec. 28, 1971

INVENTOR.
JOHN A. HAASE

BY

*Richard P. Ulbricht*

ATTORNEY

DISPLAY APPARATUS

BACKGROUND OF THE INVENTION

In the broadest sense display devices include all apparatus which converts intelligence or data to a visual form. Everyone is familiar with some form of display device, for example the old fashioned theater marquee, the television tube, or in the computer art the indicator associated with a flip-flop or a plurality of flip-flops which cooperate to form a pattern, the pattern providing the intelligence. The indicator itself may be electrical or mechanical. This invention is concerned with electrical indicators.

It is often desirable to indicate the contents of registers. It is especially desirable to indicate the contents of those registers containing information which can be interpreted by human beings without translation. It is most desirable to indicate the contents of those registers containing numerical or alphanumerical information. Although this device may be used to indicate the presence of data in other forms, the specific embodiment described herein displays information in a form of numerals. The numerals being generated by selectively illuminating one or more of seven elements making up a match stick font.

SUMMARY OF THE INVENTION

This invention relates to the display or indicator art. More specifically, it relates to the art of displaying and transferring the bits of information contained in bistable devices. Even more specifically, it relates to the means for serially displaying numeric information in a match stick font of seven elements.

It is an object of this invention to provide apparatus for displaying digital data.

It is another object of this invention to provide apparatus for displaying numerical data in a seven element match stick font.

It is an additional object of this invention to provide apparatus for displaying characters which are received and transmitted serially.

It is a further object of this invention to provide apparatus for controlling the location of serially received data.

It is another object of this invention to use the fold-back characteristic of the commercially available voltage regulator to control the advancing of a ring.

It is another object of this invention to use inductance means to provide sufficient signal to change the impedance of coupling means from a high-impedance level to a low-impedance level.

Finally it is an object of this invention to provide coupling means having a low impedance when a threshold voltage is exceeded and a high impedance at all other voltage levels less than the threshold level.

FIG. 2 is a curve showing the fold-back characteristic of the voltage regulator used in the ring of this invention.

FIG. 3 is a specific embodiment of a ring used in this invention.

DESCRIPTION OF THE PREFERRED EMBODIMENT

Figure 1:
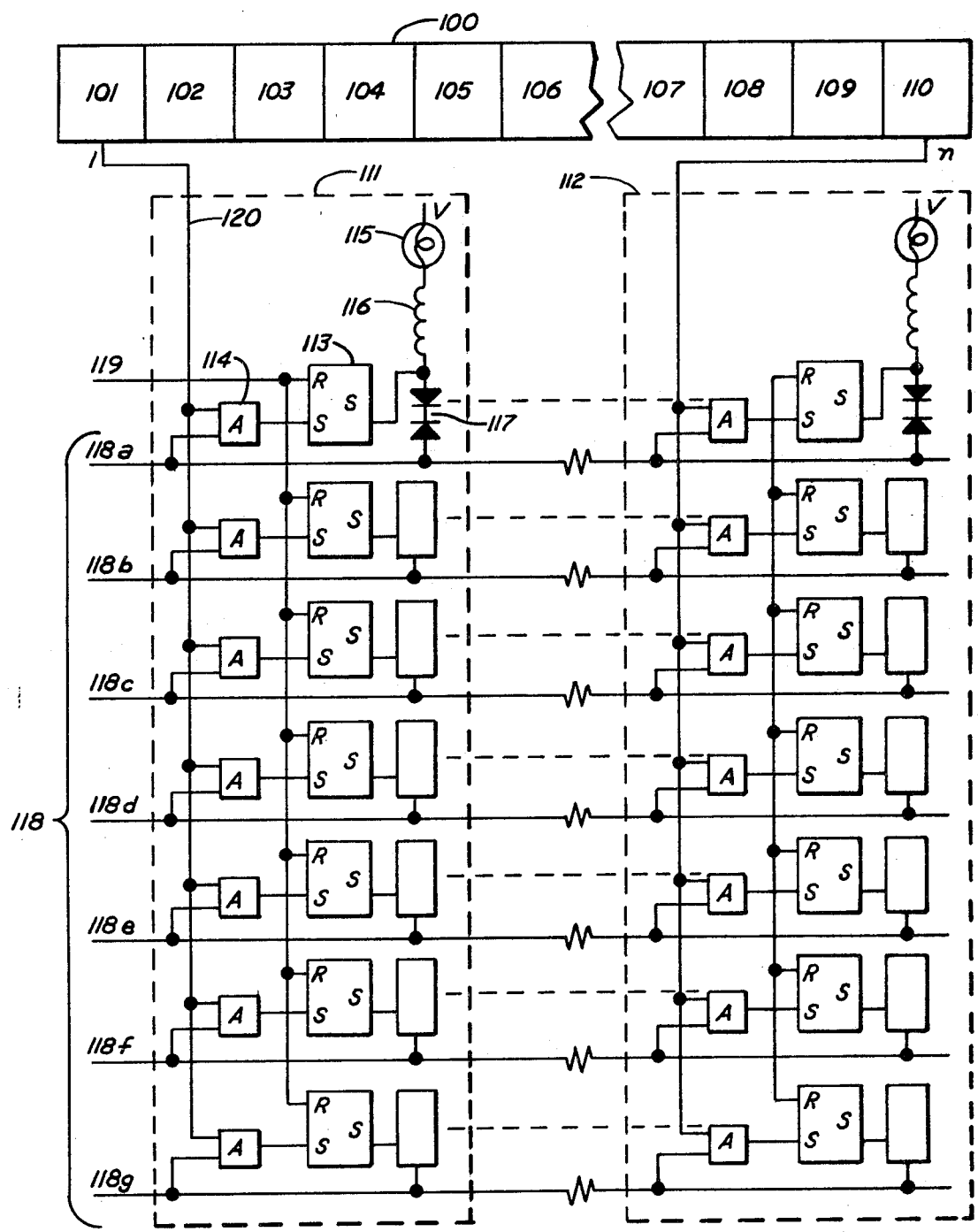
FIG. 1 is a schematic showing the basic elements of this invention.

Referring to FIG. 1, ring 100 is shown having a plurality of stages numbered 101, 102, 103, etc. A plurality of storage elements are associated with each ring stage. The group of storage elements associated with stage one are numbered 111. The number of elements in a group is dictated by the number of elements in the font. Since the font in this embodiment has seven elements, there are seven storage elements in a group. The plurality of storage elements associated with stage n are numbered 112. The storage elements associated with the ring steps between stage 1 and stage n are not shown. Each storage element and its associated components is designated a storage device in this application. For example, one storage device comprises storage element 113, AND-gate 114, light emitting device 115, inductance means 116, and coupling means 117. The other storage devices shown in FIG. 1 are unnumbered but are identical with the storage device just described. Storage element 113 may be any convenient storage element as, for example, an ordinary flip-flop. AND-gate 114 may take many forms so long as a coincidence between the presence of a signal from the first stage of the ring and data on data buss 118 exists. When light emitting device 115 is to turn on, a "1" is present on data buss 118a at the same time a "1" is present on line 120 from the first stage of the ring. Light emitting device 115 may take many forms. However, the form used with the specific embodiment is one in which seven individually controllable elongated segments of light are used. Each one of the seven segments is associated with one of the seven display devices of a group. Inductance means 116 is chosen to provide sufficient voltage during the time the field collapses after current through the inductance is turned off to overcome the breakdown voltage of coupling means 117. In this way data is transferred from storage means 113 to buss 118 in response to a signal which resets or clears storage means 113. That signal is received on line 119. As can be seen, a signal on line 119 clears or resets all of the storage elements.

When the apparatus is in operation, a pulse advances sequentially from stage to stage of the ring. When the traveling pulse is present at a stage, data may be entered into the storage devices of the group associated with that stage of the ring. Assume for example that stage 101 is active. Assume further, that a "1" is received on lines 118a and 118c. In that case, the light emitting device associated with these two storage elements will turn on and all the others will remain off. The current to turn light emitting device 115 on is supplied by storage device 113. That current also flows through inductance means 116. To read the contents of seven-bit register 111, a signal is impressed on line 119 which clears all seven positions of the register. When register storage means 113 changes state, the current through inductance means 116 ceases. Since it is the nature of inductance to resist a change in current, the voltage across the inductance rapidly increases. Since coupling means 117 is chosen so that the voltage induced in inductance means 116 is high enough to exceed the breakdown voltage of coupling means 117, a signal is present on buss position 118a. This signal is received by some utilization means (not shown). Coupling means 117 is comprised of two diodes connected cathode to cathode between the output of storage means 113 and read/write buss 118.

As can be seen, characters of data may be stored in, displayed from, and received from storage devices associated with each stage of the ring. They are entered or written into a group of storage elements under control of the ring and read from or received from those stages in response to a directed read signal from other logic.

The curve of voltage versus current shown in FIG. 2 is typical of the voltage regulator used in conjunction with the preferred embodiment of ring shown in FIG. 3. As can be seen in FIG. 2, the voltage remains constant with increasing current until a knee is reached. At the knee the voltage falls off rapidly and current decreases. Hence this curve has been designated the fold-back characteristic of the device. By operating the ring so that the operating point of the ring when one stage is conducting is on the horizontal part of the characteristic and the current drawn when two stages are conducting forces the operating point around the knee of the curve, a ring may be constructed to advance quickly from stage to stage. One voltage regulator used successfully in this application is the UA723C manufactured by Fairchild Camera and Instrument Corporation.

The ring designed to operate with the voltage regulator is shown in FIG. 3. Three stages of the ring are shown. They are labeled stage 1, stage 2 and stage n. The actual number of ring stages is determined by the application. Elements 301, 303 and 305 are the basic storage elements of the ring. They are silicon controlled switches. Once one of the switches is turned on it will continue to conduct until the current flowing through it is interrupted or the voltage across it is reduced approximately to 0. Electrode 307 is connected to the anode, while electrode 309 is connected to the cathode of the device. Electrode 311 is called the anode gate, while electrode 313 is called the cathode gate. The device is a four-layer device. Starting with the anode the anode layer is P-type material, the anode gate is N-type material, the cathode gate is P-type material and the cathode is N-type material. The device can be made to conduct either by applying a negative signal to the anode gate or a positive signal to the cathode gate.

Voltage regulator 315 has a characteristic like that described in conjunction with FIG. 2. The regulated output voltage from voltage regulator 315 appears on line 317. Voltage buss 317 is connected to the anodes of the silicon controlled switches making up stages of the ring. The voltage on buss 317 may be reduced to 0 by closing switch 319. The switch 319 is normally closed in response to a reset command on base 355. The emitter of transistor 319 is connected to ground and the collector of 319 to voltage regulator 315. Transistor switching means 321 provides the means for setting a traveling pulse into the first stage of the ring. The pulse is set into stage 1 by applying a positive going signal to base 323 of transistor switching means 321 through resistor 339. The emitter of transistor 321 is tied to ground and its collector is connected to the anode gate of silicon controlled switch 301 through resistor 341. Anode gate 311 is also connected to buss 351 through resistor 343. The positive going signal to the base of transistor switching means 321 causes it to conduct which in turn pulls anode gate 311 toward ground. Since the voltage on buss 317, in the preferred embodiment, is approximately 6 volts, and the anode gate is at approximately ground, silicon controlled switch 301 starts conducting. As mentioned earlier the anode of 301 is connected to buss 317. The cathode is directly connected to point 325 while the cathode gate is connected to point 325 through resistor 347. Point 325 is connected to ground through resistor 345. Capacitor 335 is connected between point 325 and voltage buss 351 and resistor 349 is connected between point 325 and the junction between the anode of diode 329 and coupling capacitor 333. The cathode of diode 329 is connected to advance buss 327. The other end of capacitor 333 is connected to the anode gate of silicon controlled switch 303.

When silicon controlled switch 301 conducts point 325 rises to a positive level. Advance line 327 is normally at a positive voltage with respect to ground. In the preferred embodiment this voltage is approximately 6 volts. The level must be sufficiently high to reverse bias diodes 329 and 331. Since the anode of diode 329 is only slightly less positive than advance buss 327, diode 329 will be forward biased by a pulse on the advance line which goes to ground. Since the anode of diode 331 is approximately at ground, the pulse on the advance line will not affect it. The pulse which forward biases diode 329 passes through capacitor 333 and forward biases the anode to anode gate junction of silicon controlled switch 303. Since the anode junction is forward biased, silicon controlled switch 303 begins to conduct. When silicon controlled switch 303 begins to conduct, it draws sufficient current to cause voltage regulator 315 to fold-back thereby forcing the output voltage of the regulator to drop significantly. When the voltage on buss 317, hence the voltage on the anode of silicon controlled switch 301, drops below the cathode voltage being maintained by capacitor 335, silicon controlled switch 301 becomes reverse biased and conduction ceases. Since capacitor 337 tends to maintain the cathode of silicon controlled switch 303 at ground, it insures that stage 303 will go into heavy conduction. Resistor 339 controls the base current to transistor 321, while resistors 341 and 343 form a voltage divider which controls the amount of forward bias across the anode junction of silicon controlled switch 301. Resistor 345 controls the current through silicon controlled switch 301 and establishes its operating level at a point on the horizontal portion of the characteristic curve. Resistor 347 ties the cathode gate to the cathode.

The process described in connection with stages 1 and 2 continues through the remaining stages of the ring until the traveling pulse is stored in stage $n$. Conduction in stage $n$ may be extinguished either by resetting the ring with transistor means 319, or forcing stage one to conduct through transistor switching means 321. In the preferred embodiment voltage buss 351 is at 6 volts.

Identically positioned components in each stage are identical to those described in connection with stage 1.

Figure 4:
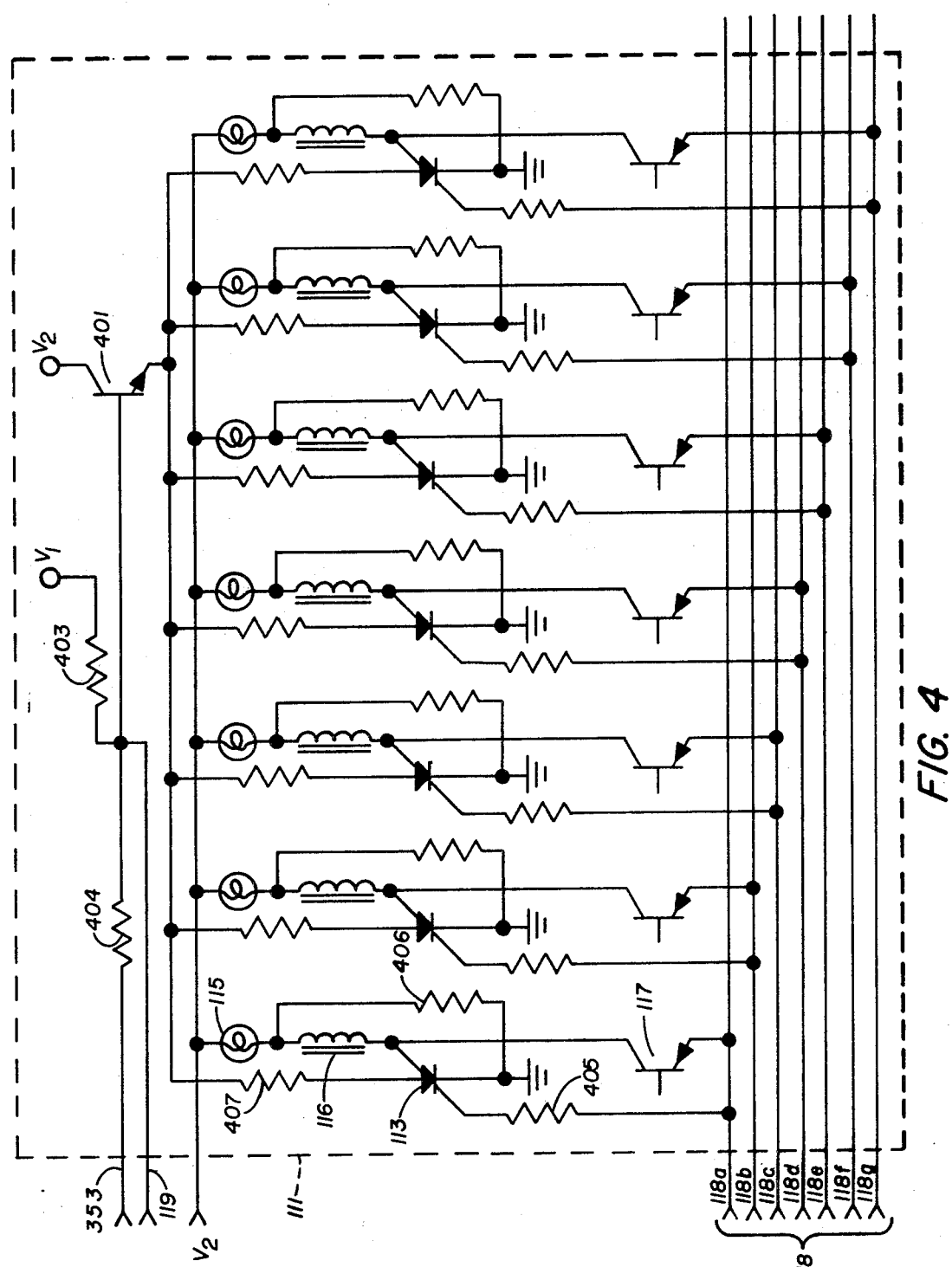
FIG. 4 is a specific embodiment of a group of display devices.

Output line 353, which is shown leaving FIG. 3, is shown connected to one end of resistor 404 in FIG. 4. The other end of resistor 404 is connected to one end of resistor 403 and to the base of transistor 401. The other end of resistor 403 is connected to voltage buss $V_1$. The collector of transistor 401 is connected to $V_2$ while the emitter of transistor 401 is connected to the anodes of all the storage elements through resistors. In the preferred embodiment voltage $V_1$ is at 12 volts and voltage $V_2$ is 6 volts. The apparatus shown in FIG. 4 is a preferred embodiment of the display devices shown in FIG. 1. Like numbers have been used for like elements in both figures. All the apparatus on the page has been designated 111. One storage device comprises: storage element 113; resistor 407 which is connected between the anode of 113 and the emitter of transistor switching means 401; resistor 405 connecting the cathode gate of silicon controlled switch 113 to line 118a of read/write buss 118; inductance means 116 connected on one end of the anode gate of 113 and the collector of coupling means 117 and on the other end to light emitting device 115, the other end of which is connected to buss $V_2$; coupling means 117, the emitter of which is connected to line 118a; and resistor 406 which is connected on one end to the junction between light emitting device 115 and inductance means 116 and on the other end to the cathode of silicon controlled switch 113, the cathode of 113 is also connected to ground. The other storage devices shown in the drawing are identical to the one just described.

The functional equivalent of AND-gate 114 (shown in FIG. 1) exists in the apparatus shown in FIG. 4 when a selection signal from ring stage 101 appears on line 353 (which raises the base and consequently the emitter of emitter follower 401 to its most positive level) in coincidence with a bit of information on line 118a of input-output buss 118. This combination of signals produces conduction in silicon controlled switch 113 by providing a positive anode voltage and a positive signal on the cathode gate. In the absence of a positive signal on line 353, all of the anode junctions of the group of seven display devices are heavily reverse biased, and in the absence of a signal on the cathode gate there will be no forward bias to induce conduction.

Coupling means 117 in the preferred embodiment is a PNP-transistor having an emitter junction breakdown of 6 volts and a collector junction breakdown of 20 volts. In other words, whenever the collector is positive with respect to the emitter by more than 6 volts, the transistor will breakdown. On the other hand, the emitter must be more than 20 volts positive with respect to the collector in order for the transistor to breakdown.

Because of the difference in breakdown potential, receipt of a positive going pulse on the read/write buss during write which sets data into storage element 113 has insufficient magnitude to breakdown coupling device 117. Therefore, coupling device 117 retains its high impedance. On the other hand, when the information stored in storage device 113 is to be read from the device the current through inductor 116 is cut off, the voltage across the inductor rapidly increases to the point where it exceeds the 6 volt breakdown voltage of the coupling device and a pulse is applied to the read/write buss which is picked up by a utilization device.

Figure 5:
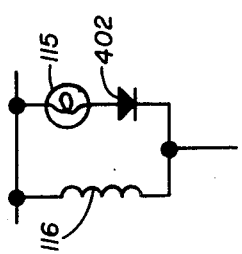
FIG. 5 shows an alternate method of wiring the indication means of this invention.

The combination shown in FIG. 5 is a substitute for the serial combination of the light emitting device and inductance means previously described. In this case the inductance means functions in the same manner as before. Diode 402 provides a high-impedance path at the time the field of the inductance collapses. Resistors 403 and 404 comprise a voltage divider for controlling the voltage level at the base of transistor switching means 401. Resistor 405 establishes the current to the cathode gate upon receipt of a pulse on line 118a. Resistor 406 preconditions the light emitting means and controls the DC level at the anode gate when the silicon controlled switch is not conducting. Resistor 407 controls the current through silicon controlled switch 113. Like positioned elements in the other six display devices perform like functions. Consequently, they are not numbered.

I claim:

1. A display device comprising:
   a. a light emitting device, the device being turned on and emitting light in response to an impressed voltage, and being turned off when the impressed voltage is removed;
   b. inductance means for developing an output signal when the light emitting device is turned off, the inductance means being interconnected with the light emitting device;
   c. storage means for applying a voltage, including the impressed voltage, to the light emitting device and the inductance means, said storage means having a first input signal line for receiving data from an external source and a second input signal line for receiving a reset signal; and
   d. coupling means, connected between the inductance means and the first input signal line, for transferring the output signal to said first input signal line.

2. The display device of claim 1 wherein the storage means is a silicon controlled switch.

3. The display device of claim 1 wherein the inductance means is connected serially with the light emitting device.

4. The display device of claim 1 wherein the coupling means is a pair of diodes with like electrodes connected together to provide a high impedance until a threshold voltage has been exceeded.

5. The display device of claim 2 wherein the inductance means is connected serially with the light emitting device; and the coupling means is a pair of diodes with like electrodes connected together to provide a high impedance until a threshold voltage has been exceeded.

6. Display apparatus comprising:
   a. a voltage regulator having a fold-back characteristic;
   b. a ring counter having a plurality of stages, each stage having at least one bistable device, the ring counter providing means for positioning incoming data, ring counter advance occuring during fold-back of the voltage regulator;
   c. storage means for retaining data, the data being received in groups over data input lines and the storage means being divided into groups capable of accepting one group of data at a time, the group of storage means accepting data being determined by the ring counter, a number of stages within a group of storage means being determined by the number of display elements;
   d. light emitting devices for forming a character corresponding to input data received, the number of light emitting devices being equal to the number of display elements; and
   e. reading means for transferring data from the light emitting devices to the data input lines a group at a time in response a directed read signal, the reading means including inductance means for providing read data, and coupling means, the coupling means having a first impedance to the flow of current in one direction when a threshold voltage is exceeded and another impedance to the flow of current in either direction substantially higher than the first impedance when the threshold voltage is not exceeded.

7. A display system comprising:
   a. a sequential ring counter having a plurality of bistable devices to sequentially transfer a pulse from one bistable device to the next in response to an advance pulse, and means for introducing said pulse into the first bistable device of the sequence, and output means connected to each bistable device for transferring said pulse; and
   b. a plurality of light emitting display devices arranged in groups and segments, each group associated with and connected to one bistable device output means, and including a predetermined number of segments, each segment comprising:
      1. an AND gate having inputs connected to said bistable device output means and to a data input terminal and having an output terminal,
      2. a bistable storage element having an input connected to said AND gate output terminal and having an output line for carrying a signal representative of the data being stored in the storage element, and having a second input connected to a reset signal line,
      3. a light emitting device connected to said bistable storage element output line,
      4. an inductor connected to said light emitting device in a series conductive relationship whereby an inductive voltage rise is produced when the light emitting device is turned off,
      5. coupling means, connected to said inductor and to said data input terminal, for transferring said inductive voltage rise to said data input terminal.

\* \* \* \* \*